United States Patent
Wu (10) Patent No.: US 10,149,289 B2
(45) Date of Patent: Dec. 4, 2018

(54) METHOD OF HANDLING DOWNLINK-ONLY CARRIER AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 267 days.

(21) Appl. No.: 14/659,631

(22) Filed: Mar. 17, 2015

(65) Prior Publication Data

US 2015/0271792 A1 Sep. 24, 2015

Related U.S. Application Data

(60) Provisional application No. 61/955,215, filed on Mar. 19, 2014.

(51) Int. Cl.
*H04L 12/18* (2006.01)
*H04W 72/04* (2009.01)
*H04J 3/00* (2006.01)

(52) U.S. Cl.
CPC ............ *H04W 72/042* (2013.01); *H04J 3/00* (2013.01); *H04W 72/0446* (2013.01)

(58) Field of Classification Search
None
See application file for complete search history.

(56) References Cited

U.S. PATENT DOCUMENTS

| 2009/0122740 A1* | 5/2009 | Bouazizi | H04W 72/005 370/312 |
| 2011/0216677 A1* | 9/2011 | Ahmadi | H04L 1/0041 370/295 |
| 2012/0213141 A1* | 8/2012 | Damnjanovic | H04W 72/005 370/312 |
| 2014/0198685 A1* | 7/2014 | Xu | H04W 24/02 370/254 |
| 2015/0208372 A1* | 7/2015 | You | H04J 11/0069 370/350 |
| 2015/0381378 A1* | 12/2015 | Zhang | H04W 72/005 370/312 |

FOREIGN PATENT DOCUMENTS

| EP | 1959617 A1 | 8/2008 |
| WO | 2011/162537 A2 | 12/2011 |

(Continued)

OTHER PUBLICATIONS

European Search report dated Jul. 7, 2015 for EP application No. 15159691.3.

(Continued)

*Primary Examiner* — Sithu Ko
(74) *Attorney, Agent, or Firm* — Winston Hsu (57) ABSTRACT

A method of handling a downlink (DL)-only carrier for a communication device comprises receiving system information on the DL-only carrier transmitted by a network, wherein the system information does not comprise at least one information element for an uplink (UL) transmission and the at least one information element is mandatory to be present in the system information according to a third Generation Partnership Project (3GPP) standard, and determining that the system information is valid.

7 Claims, 7 Drawing Sheets

(56) References Cited

FOREIGN PATENT DOCUMENTS

| WO | 2011/162537 | A3 | 12/2011 |
|----|-------------|----|---------|
| WO | 2011162537  | A2 | 12/2011 |
| WO | 2011162537  | A3 | 12/2011 |

OTHER PUBLICATIONS

NTT DOCOMO, Inc., Telecom Italia, KT, Sharp, Hitachi, NEC, Telefonica, Orange, NTT, Motorola Mobility, Panasonic, SK telecom, TeliaSonera, Kyocera, IAESI, ATR, Institute for Infocomm Research, LightSquared, HTC, Fujitsu, ITL Inc., Dish, Acer, EADS, NTC, Cisco, Sumitomo Electric, Mitsubishi Electric, CEWit, "Motivation for New WI: Supplemental Downlink for TD-LTE", 3GPP TSG-RAN #63, RP-140419 Revision of RP-140211, Mar. 3-6, 2014, Fukuoka, Japan, XP050781400, pp. 1-6.

Orange, "Revised Work Item: L-band for Supplemental Downlink in E-UTRA and UTRA", 3GPP TSG RAN Meeting #63, RP-140092 revision of RP-132041, Mar. 3-6, 2014, Fukuoka, Japan, XP050786223, pp. 1-7.

European Search report dated Oct. 26, 2015 for EP application No. 15159691.3.

3GPP TS 36.331 V12.0.0 (Dec. 2013) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TS 36.101 V12.2.0 (Dec. 2013) Technical Specification 3rd Generation Partnership Project; Technical Specification Group Radio Access Network; Evolved Universal Terrestrial Radio Access (E-UTRA); User Equipment (UE) radio transmission and reception (Release 12).

Search Report dated Dec. 8, 2017 for EP application No. 17184928.4, pp. 1-6.

3GPP TS 36.331 V12.0.0 (Dec. 2013), "3rd Generation Partnership Project; Technical Specification Group Radio Access Network; Evolved Universal Terrestrial Radio Access (E-UTRA); Radio Resource Control (RRC); Protocol specification (Release 12)", XP050752674, pp. 1-349.

* cited by examiner

METHOD OF HANDLING DOWNLINK-ONLY CARRIER AND RELATED COMMUNICATION DEVICE

CROSS REFERENCE TO RELATED APPLICATIONS

This application claims the benefit of U.S. Provisional Application No. 61/955,215, filed on Mar. 19, 2014 and incorporated herein by reference.

BACKGROUND OF THE INVENTION

1. Field of the Invention

The present invention relates to a method used in a wireless communication system and related communication device, and more particularly, to a method of handling a downlink-only carrier and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

There are two duplexing modes for transmissions between the UE and the eNB in the LTE/LTE-A system: frequency-division duplexing (FDD) and time-division duplexing (TDD). In the FDD mode, a downlink (DL) transmission and a UL transmission are performed via different carriers (i.e., carrier frequencies). In the TDD mode, the DL transmission and the UL transmission can be performed in different subframes on the same carrier.

In certain situations, an eNB may be configured to transmit system information on a carrier which does not correspond to any UL carrier or is not configured with any UL subframe. This carrier is called a DL-only carrier. When the UE receives the system information on the DL-only carrier, the UE recognizes the system information as invalid according to the 3GPP standard. That is, the UE does not know how to process the system information, because the system information may include an information element which is related to a UL transmission, e.g., PRACH configuration, and the UE needs a UL carrier to process the system information while there is no such UL carrier. Furthermore, the UE may consider a cell using the DL-only carrier as invalid due to the invalid system information.

Thus, operation related to the DL-only carrier is an important problem to be solved.

SUMMARY OF THE INVENTION

The present invention therefore provides a method and related communication device for handling a DL-only carrier to solve the abovementioned problem.

A method of handling a downlink (DL)-only carrier for a communication device comprises receiving system information on the DL-only carrier transmitted by a network, wherein the system information does not comprise at least one information element for an uplink (UL) transmission and the at least one information element is mandatory to be present in the system information according to a third Generation Partnership Project (3GPP) standard, and determining that the system information is valid.

A method of handling a downlink (DL)-only carrier for a network comprises transmitting system information on the DL-only carrier to a communication device, wherein the system information does not comprise at least one information element for an uplink (UL) transmission and the at least one information element is mandatory to be present in the system information according to a third Generation Partnership Project (3GPP) standard.

A method of handling a downlink (DL)-only carrier for a communication device comprises receiving system information on the DL-only carrier transmitted by a network, wherein the system information comprises at least one information element for an uplink (UL) transmission and the at least one information element is mandatory to be present in the system information according to a third Generation Partnership Project (3GPP) standard, and determining that the system information is valid.

A method of handling a downlink (DL)-only carrier of a time-division duplexing (TDD) band for a network comprises transmitting first system information on the DL-only carrier to a communication device, wherein the first system information comprises a TDD-Config indicating one of UL/DL configurations 0-6, and transmitting second system information on the DL-only carrier to the communication device, wherein the second system information comprises a new TDD-Config indicating a UL/DL configuration including only DL subframes.

A method of handling a downlink (DL)-only carrier of a time-division duplexing (TDD) band for a network comprises not transmitting first system information on the DL-only carrier to a communication device, wherein the first system information comprises at least one information element for an uplink (UL) transmission and the at least one information element is mandatory to be present in the system information according to a third Generation Partnership Project (3GPP) standard, and transmitting second system information for a multimedia broadcast multicast service (MBMS) service on the DL-only carrier to the communication device, wherein the second system information does not have all of the at least one information element for the UL transmission.

These and other objectives of the present invention will no doubt become obvious to those of ordinary skill in the art

DETAILED DESCRIPTION

Figure 1:
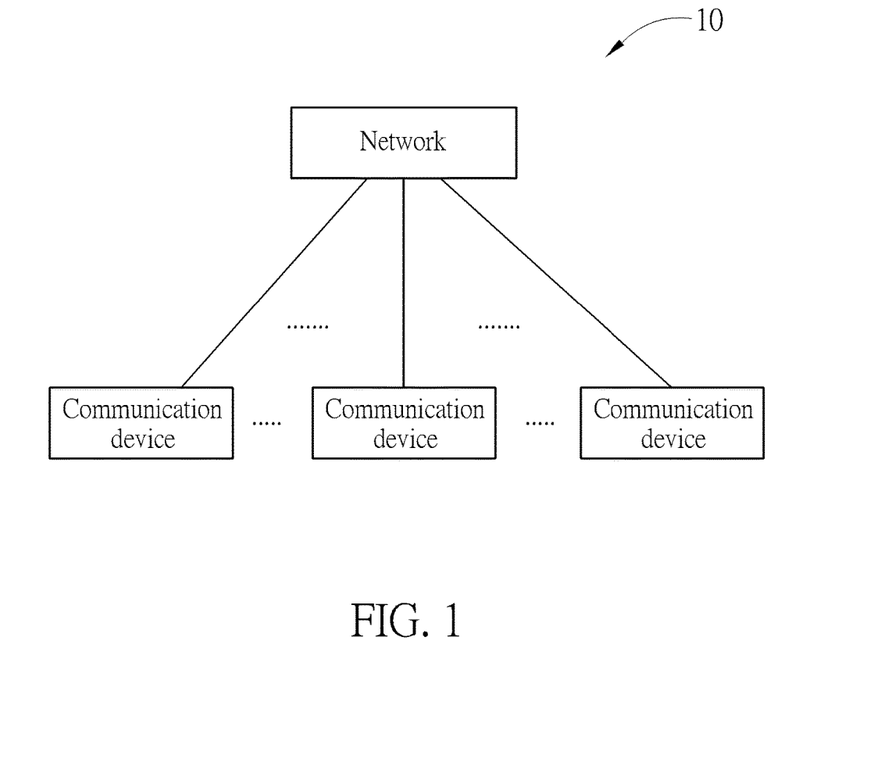
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. The network and the communication devices may support a multimedia broadcast multicast service (MBMS) service. The wireless communication system 10 may support a frequency-division duplexing (FDD) mode. That is, the network and the communication devices can communicate with each other by using a UL carrier and/or a DL carrier (e.g., DL-only carrier). The wireless communication system 10 may support a time-division duplexing (TDD) mode. That is, the network and the communication devices can communicate with each other by using uplink (UL) subframes and downlink (DL) subframes in a TDD carrier of a TDD band according to one or more UL/DL configurations.

Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a device-to-device (D2D) device, a mobile phone, a laptop, a tablet computer, an electronic book, a portable computer system, or combination thereof. In addition, the network and the communication device can be seen as a transmitter or a receiver according to direction (i.e., transmission direction), e.g., for a UL, the communication device is the transmitter and the network is the receiver, and for a DL, the network is the transmitter and the communication device is the receiver.

Figure 2:
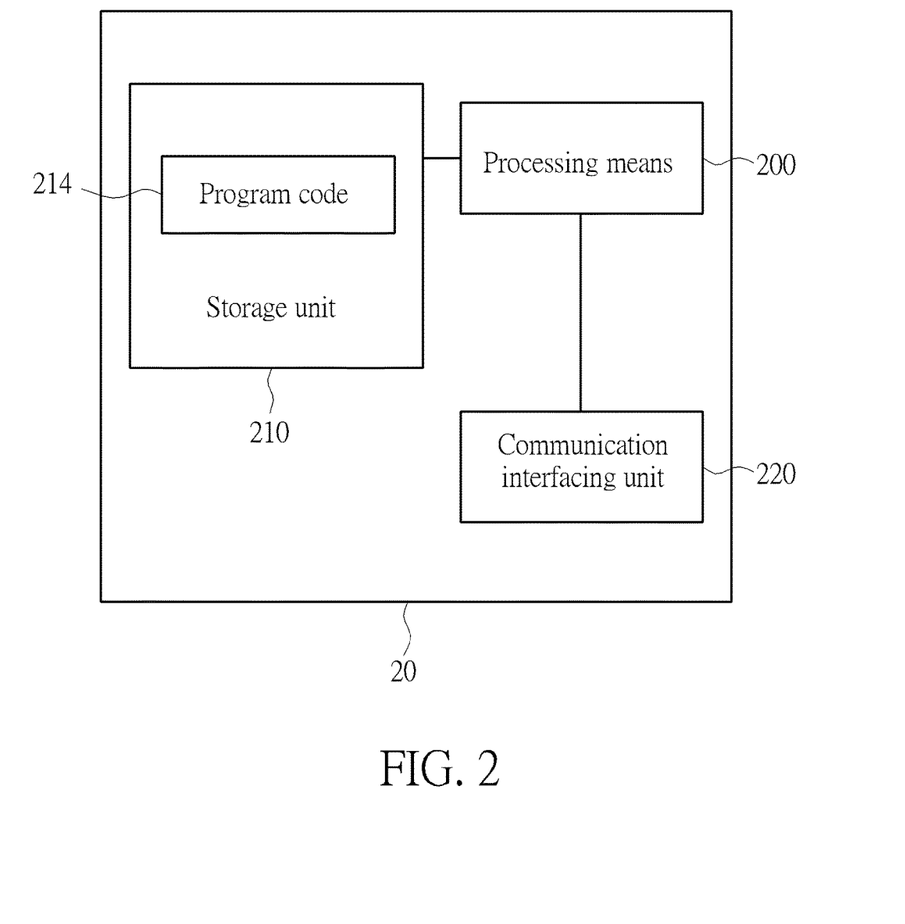
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
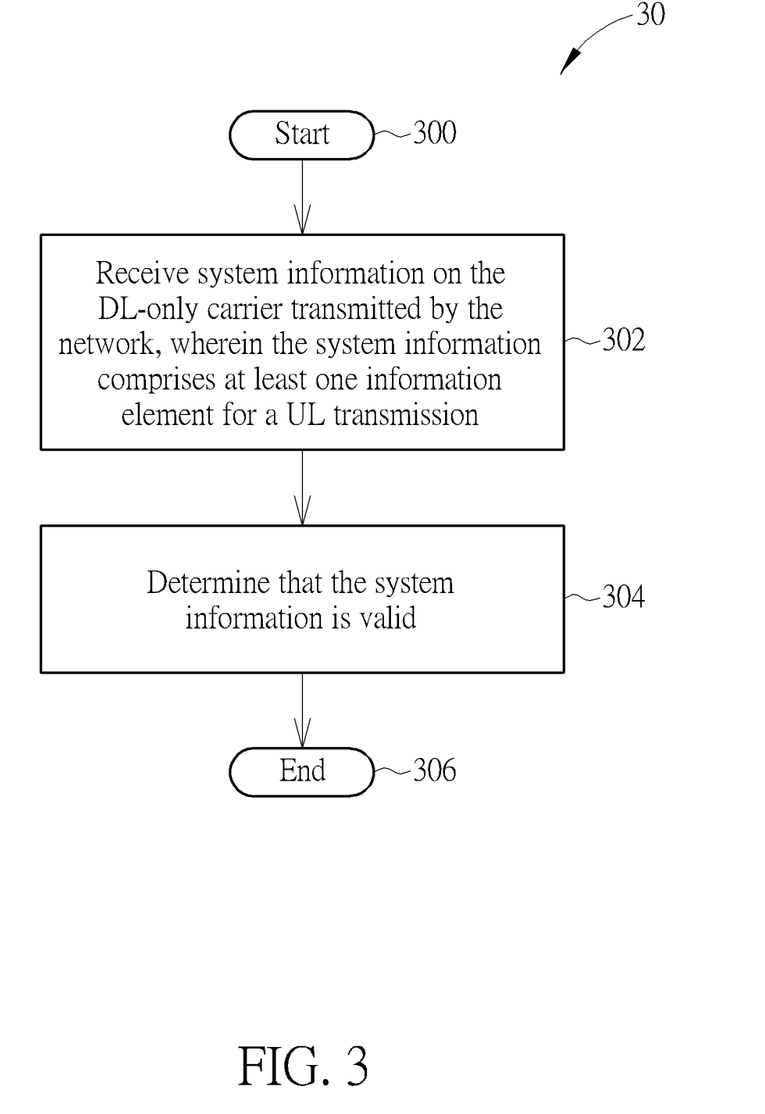
FIGS. 3-7 are flowcharts of processes according to examples of the present invention.

FIG. 3 is a flowchart of a process 30 according to an example of the present invention. The process 30 may be utilized in a communication device for handling a DL-only carrier (e.g., FDD DL carrier). The process 30 may be compiled into the program code 214 and includes the following steps:

Step 300: Start.

Step 302: Receive system information on the DL-only carrier transmitted by the network, wherein the system information comprises at least one information element for a UL transmission.

Step 304: Determine that the system information is valid.

Step 306: End.

According to the process 30, the communication device may receive system information on the DL-only carrier transmitted by the network, wherein the system information may include at least one information element for a UL transmission and the information element is mandatory to be present in the system information according to a third Generation Partnership Project (3GPP) standard. Then, the communication device may determine that the system information is valid. That is, the communication device may not discard (e.g., ignore) the system information, even if the system information received on the DL-only carrier is related to a UL carrier. For example, the system information may include (or simply be) System Information Block Type 2 (SIB2) which includes an information element prach-Config which is mandatory to be present as defined in the LTE/LTE-A system. That is, the system information may be defined to include the information element. In one example, the DL-only carrier may be configured for a MBMS service. That is, the DL-only carrier may be used by the network for providing (e.g., broadcasting) the MBMS service to the communication device. In another example, the DL-only carrier may be configured for a DL transmission to the communication device according to a carrier aggregation (CA). Although the system information is determined valid, the communication device may determine that the system information is valid by ignoring the at least one information element in the system information. That is, the at least one information element for the UL transmission may be ignored (e.g., discarded), while one or more information elements for a DL transmission and/or other purposes may be kept.

Thus, according to the above description, the communication device can handle the DL-only carrier regularly, e.g., comprehend (e.g., recognize) the system information received on the DL-only carrier. As a result, the communication device can receive a service (e.g., MBMS service) provided via the DL-only carrier by the network according to the system information.

Figure 4:
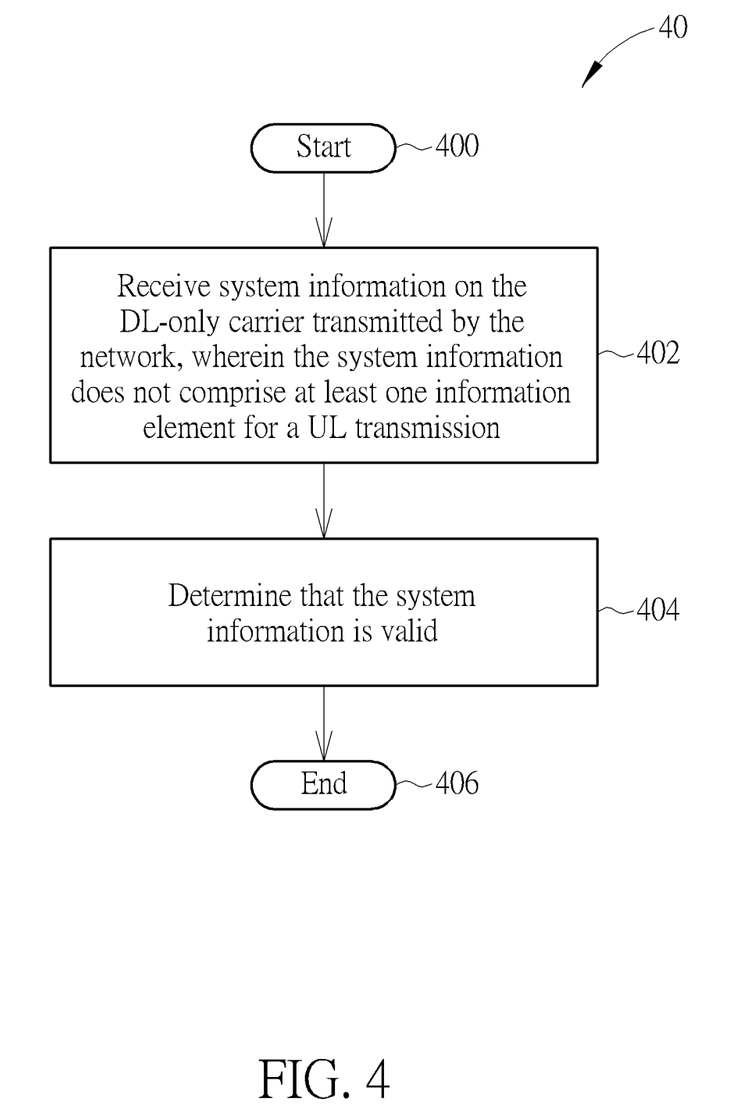

FIG. 4 is a flowchart of a process 40 according to an example of the present invention. The process 40 may be utilized in a communication device for handling a DL-only carrier (e.g., FDD DL carrier). The process 40 may be compiled into the program code 214 and includes the following steps:

Step 400: Start.

Step 402: Receive system information on the DL-only carrier transmitted by the network, wherein the system information does not comprise at least one information element for a UL transmission.

Step 404: Determine that the system information is valid.

Step 406: End.

According to the process 40, the communication device may receive system information on the DL-only carrier transmitted by the network, wherein the system information may not include at least one information element for a UL transmission and the at least one information element is mandatory to be present in the system information according to a 3GPP standard. Then, the communication device may determine that the system information is valid. That is, the communication device may not discard (e.g., ignore) the system information, even if the system information received on the DL-only carrier is related to a UL carrier and does not include the at least one information element. For example, the system information may include (or simply be) SIB2 which includes an information element prach-Config which is mandatory to be present as defined in the LTE/LTE-A system. That is, the system information may be defined to include the information element. In one example, the DL-only carrier may be configured for a MBMS service. That is, the DL-only carrier may be used by the network for providing (e.g., broadcasting) the MBMS service to the communication device. In another example, the DL-only carrier may be configured for a DL transmission to the communication device in a CA.

In one example, the at least one information element may include a TDD-Config and the system information may further include a new TDD-Config indicating a UL/DL configuration comprising only DL subframes, when the DL-only carrier is a TDD DL-only carrier Thus, according to the above description, the communication device can handle the DL-only carrier regularly, e.g., comprehend (e.g., recognize) the system information received on the DL-only carrier. As a result, the communication device can receive a service (e.g., MBMS service) provided via the DL-only carrier by the network according to the system information.

Figure 5:
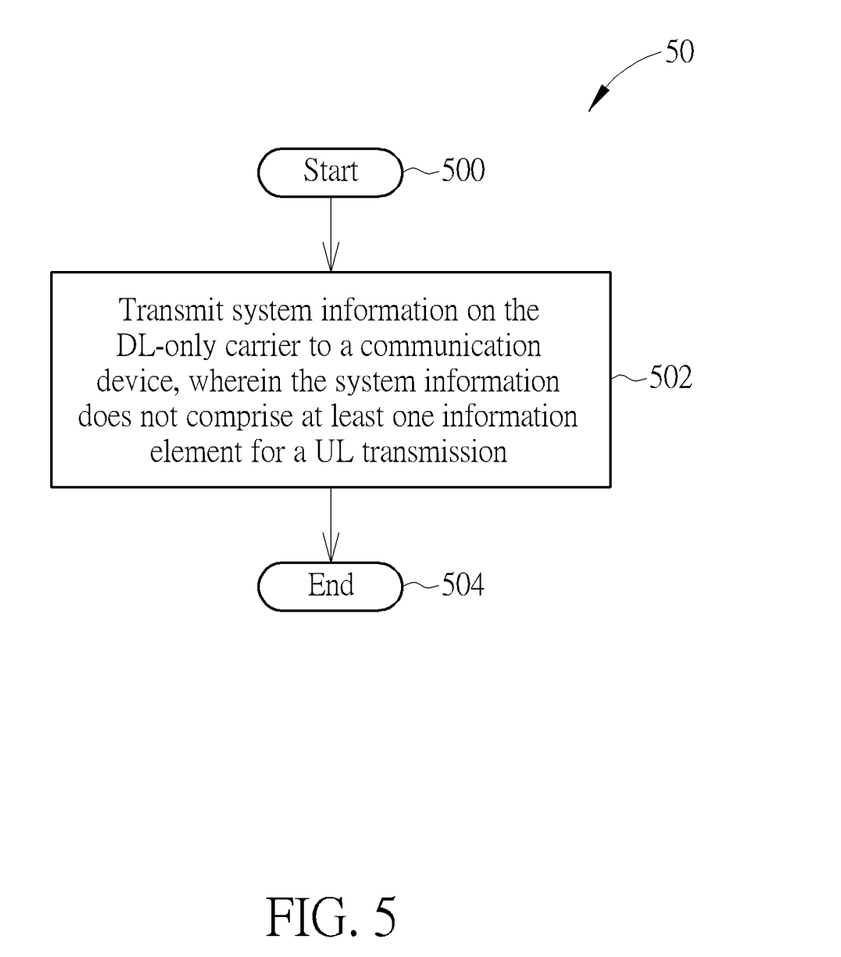

FIG. 5 is a flowchart of a process 50 according to an example of the present invention. The process 50 may be utilized in the network for handling a DL-only carrier (e.g., FDD DL carrier). The process 50 may be compiled into the program code 214 and includes the following steps:

Step 500: Start.

Step 502: Transmit system information on the DL-only carrier to a communication device, wherein the system information does not comprise at least one information element for a UL transmission.

Step 504: End.

According to the process 50, the network may transmit system information on the DL-only carrier to a communication device, wherein the system information may not include at least one information element for a UL transmission and the at least one information element is mandatory to be present in the system information according to a 3GPP standard. The network may realize the process 50, when communicating with a communication device realizing the process 40. For example, the system information may include (or simply be) SIB2 which further includes an information element prach-Config which is mandatory to be present as defined in the LTE/LTE-A system. That is, the system information may be defined to include the information element. In one example, the DL-only carrier may be configured for a MBMS service. That is, the DL-only carrier may be used by the network for providing (e.g., broadcasting) the MBMS service to the communication device. In another example, the DL-only carrier may be configured for a DL transmission to the communication device in a CA. In one example, the system information may include a new TDD-Config which indicates a UL/DL configuration comprising only DL subframes.

The network in the process 50 may be configured to transmit the at least one information element or not according to whether a carrier is a DL-only carrier or not. When the network is configured to perform a transmission on a carrier which is not a DL-only carrier, the network transmits the at least one information element. When the network is configured to perform a transmission on a carrier which is a DL-only carrier, the network does not transmit the at least one information element.

Thus, according to the above description, the network can handle the DL-only carrier regularly by transmitting the system information which can be comprehended (e.g., recognized) by a communication device on the DL-only carrier. As a result, the network can provide a service (e.g., MBMS service) via the DL-only carrier to the communication device.

Figure 6:
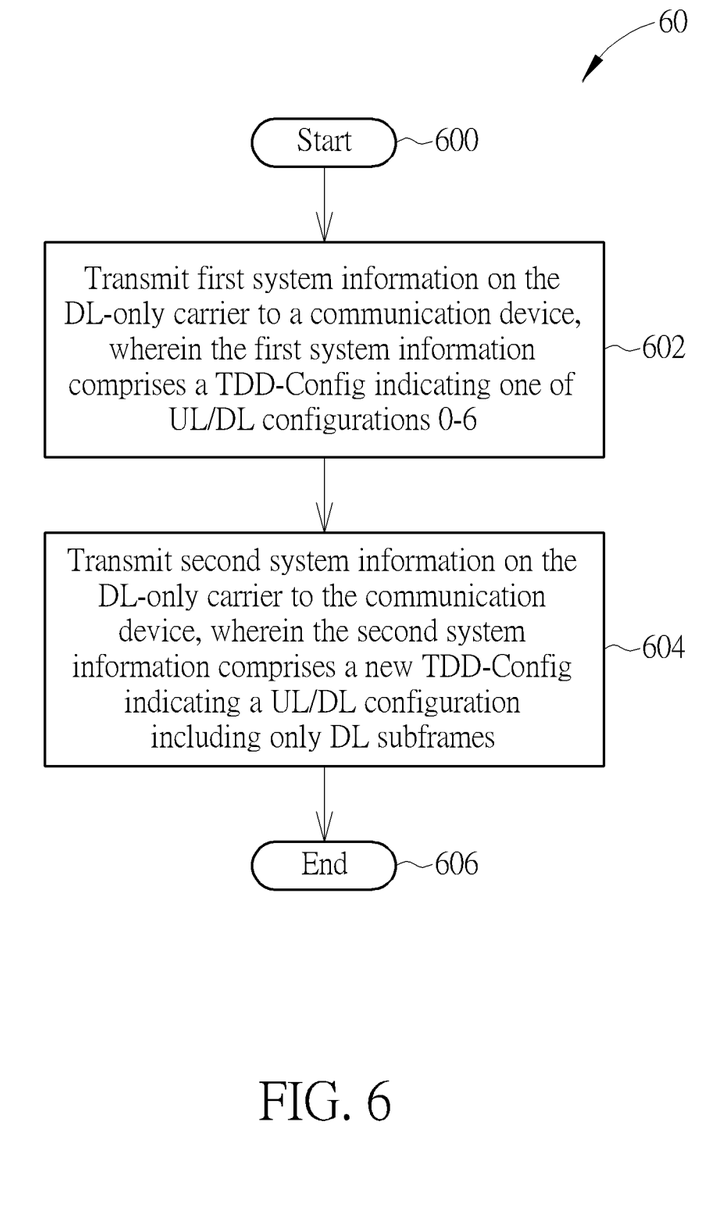

FIG. 6 is a flowchart of a process 60 according to an example of the present invention. The process 60 may be utilized in the network for handling a DL-only carrier of a TDD band (e.g., TDD DL carrier). The process 60 may be compiled into the program code 214 and includes the following steps:

Step 600: Start.

Step 602: Transmit first system information on the DL-only carrier to a communication device, wherein the first system information comprises a TDD-Config indicating one of UL/DL configurations 0-6.

Step 604: Transmit second system information on the DL-only carrier to the communication device, wherein the second system information comprises a new TDD-Config indicating a UL/DL configuration including only DL subframes.

Step 604: End.

According to the process 60, the network may transmit first system information on the DL-only carrier (e.g., including only DL subframes) to a communication device, wherein the first system information may include a TDD-Config indicating one of UL/DL configurations 0-6 (e.g., TDD configurations defined in the 3GPP standard). The network may transmit second system information on the DL-only carrier to the communication device, wherein the second system information may include a new TDD-Config indicating a UL/DL configuration including only DL subframes (i.e., no UL subframe). The network may realize the process 60, when communicating with a communication device realizing the process 30. In one example, the DL-only carrier may be configured for a MBMS service. That is, the DL-only carrier may be used by the network for providing (e.g., broadcasting) the MBMS service to the communication device. In another example, the DL-only carrier may be configured for a DL transmission to the communication device in a CA. Please note that the first system information and the second system information may be same or different.

The network may be configured to transmit the new TDD-Config or not according to whether a carrier is a DL-only carrier or not. When the network is configured to perform a transmission on a carrier which is not a DL-only carrier, the network does not transmit the new TDD-Config. When the network is configured to perform a transmission on a carrier which is a DL-only carrier, the network transmits the new TDD-Config. From a UE's perspective, when the UE receives the TDD-Config but does not receive the new TDD-Config, the UE applies the TDD-Config. When the UE receives both the TDD-Config and the new TDD-Config, the UE applies the new TDD-Config instead of the TDD-Config. In other words, the UE determines to apply the TDD-Config when the UE does not receive the new TDD-Config and determines not to apply the TDD-Config when the UE receives the new TDD-Config. Thus, the UE does not transmit any signal on the DL-only carrier due to the new TDD-Config.

Thus, according to the above description, the network can handle the DL-only carrier regularly by transmitting the system information which can be comprehended (e.g., recognized) by a communication device on the DL-only carrier. As a result, the network can provide a service (e.g., MBMS service) via the DL-only carrier to the communication device.

Figure 7:
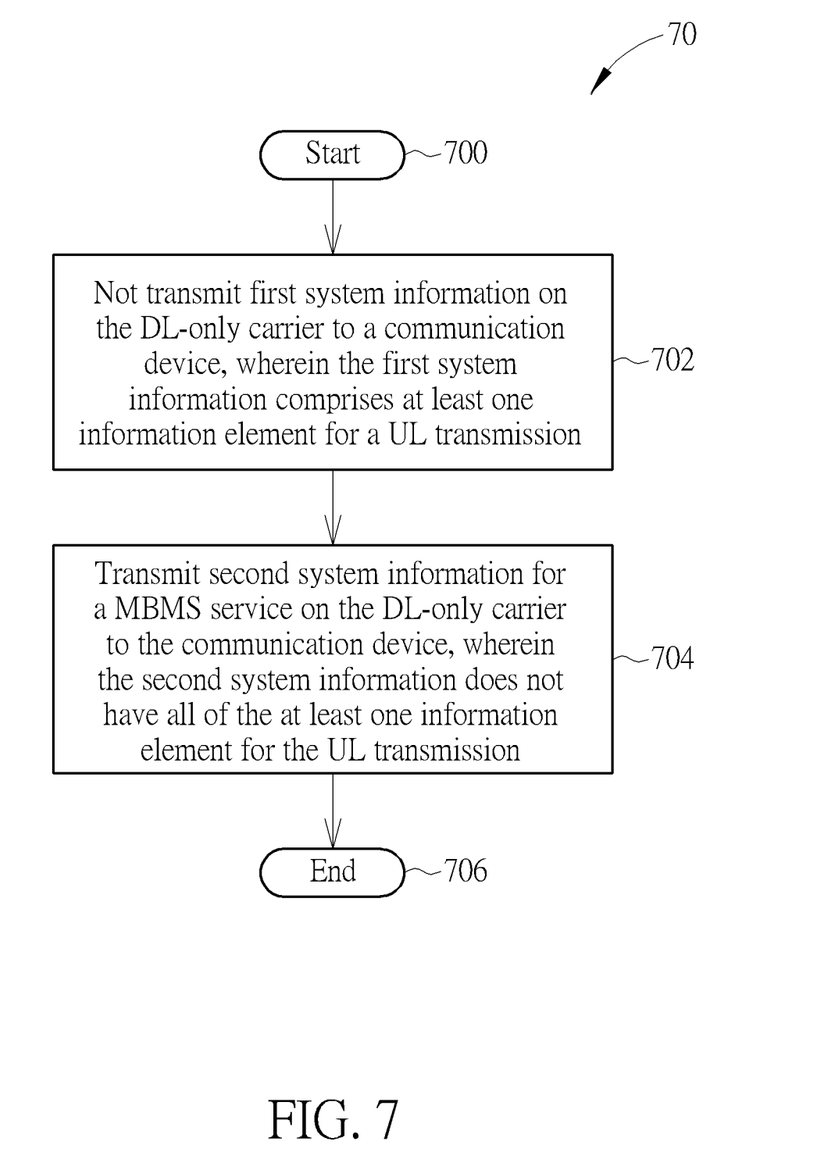

FIG. 7 is a flowchart of a process 70 according to an example of the present invention. The process 70 may be utilized in the network for handling a DL-only carrier of a TDD band (e.g., TDD DL carrier). The process 70 may be compiled into the program code 214 and includes the following steps:

Step 700: Start.

Step 702: Not transmit first system information on the DL-only carrier to a communication device, wherein the first system information comprises at least one information element for a UL transmission.

Step 704: Transmit second system information for a MBMS service on the DL-only carrier to the communication device, wherein the second system information does not have all of the at least one information element for the UL transmission.

Step 706: End.

According to the process 70, the network may not transmit first system information on the DL-only carrier (e.g., all subframes are for DL transmission) to a communication device, wherein the first system information may include at least one information element for a UL transmission and the information element is mandatory to be present in the system information according to a 3GPP standard. The network may transmit second system information for a MBMS service on the DL-only carrier to the communication device, wherein the second system information does not have all of the at least one information element for the UL transmission. That is, the situation where the communication device may not know how to handle the DL-only carrier is avoided by not transmitting the first system information on the DL-only carrier. The communication device can receive the service (e.g., MBMS service) provided via the DL-only carrier by the network according to the second system information instead of the first system information. The network may be configured to transmit the first system information or not according to whether a carrier is a DL-only carrier or not. Similarly, the network may be configured to transmit the second system information or not according to whether a carrier is a DL-only carrier or not. When the network is configured to perform a transmission on a carrier which is not a DL-only carrier, the network transmit the first system information instead of the second system information. When the network is configured to perform a transmission on a carrier which is a DL-only carrier, the network transmits the second system information instead of the first system information.

Types of the system information mentioned above are not limited herein. In one example, the first system information may include (or simply be) at least one of System Information Block Type 1 (SIB1) and SIB2 defined in the LTE/LTE-A system. In one example, the second system information may include (or simply be) at least one of the following parameters: mbsfn-SubframeConfigList, BCCH-Config, PCCH-Config, and PDSCH-ConfigCommon. In one example, the second system information may include (or simply be) at least one of the following parameters: SchedulingInfoList, si-WindowLength, systemInfoValueTag, mbsfn-SubframeConfigList, BCCH-Config, PCCH-Config, and PDSCH-ConfigCommon. In one example, the network may further transmit System Information Block Type 13 (SIB13) defined in the LTE/LTE-A system on the DL-only carrier to the communication device. In this situation, the communication device may receive the second system information, and receive the SIB13 according to the second system information. In one example, the second system information may further include a MBMS configuration for the communication device to receive the MBMS service. The communication device may receive the second system information, and receive the MBMS service according to the second system information. In another example, the second system information may further include the new TDD-Config. In other words, the second system information may be a new system information block defined in the LTE/LTE-A system for the DL only carrier.

Thus, according to the above description, the network can handle the DL-only carrier regularly by transmitting the system information which can be comprehended (e.g., recognized) by a communication device on the DL-only carrier. As a result, the network can provide a service (e.g., MBMS service) via the DL-only carrier to the communication device.

Please note that the at least one information element in the above description, examples and processes may include at least one of the following parameters: RACH-ConfigCommon, PRACH-ConfigSIB, PUSCH-ConfigCommon, PUCCH-ConfigCommon, SoundingRS-UL-ConfigCommon, UplinkPowerControlCommon, UL-CyclicPrefixLength, UplinkPowerControlCommon-v1020 and TDD-Config. That is, the information element(s) may include a subset of (which may include all of) the above parameters.

Furthermore, when the DL-only carrier is a carrier of a TDD band, the system information may include a new TDD-Config which indicates a new UL/DL configuration including only DL subframes without any UL subframe. Alternatively, other system information may include the new TDD-Config. That is, the communication device may determine that the carrier of the TDD band is the DL-only carrier according to the new TDD-Config, even if the network does provide the original TDD-Config (e.g., for one of the UL/DL configurations 0-6 where each includes at least one UL subframe) in the system information.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SIP), a computer on module (COM), and the communication device 20.

To sum up, the present invention provides a method of handling a DL-only carrier. The network and a communication device can handle the DL-only carrier regularly without performing improper operations. As a result, the communication device can receive a service (e.g., MBMS service) provided via the DL-only carrier by the network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a downlink (DL)-only carrier for a network, the method comprising:
    determining, by the network, whether a carrier is the DL-only carrier or not;
    transmitting, by the network, first system information on the carrier to a communication device when the network determines that the carrier is not the DL-only carrier;
    not transmitting, by the network, the first system information on the carrier to the communication device when the network determines that the carrier is the DL-only carrier, wherein the first system information comprises at least one information element for an uplink (UL) transmission and the at least one information element is mandatory to be present in the first system information according to a third Generation Partnership Project (3GPP) standard and comprises at least one of RACH-ConfigCommon, PRACH-Config-SIB, PUSCH-ConfigCommon, PUCCH-ConfigCommon, SoundingRS-UL-ConfigCommon, UplinkPowelControlCommon, UL-CyclicPrefixLength, UplinkPowelControlCommon-v1020 and TDD-Config;
    not transmitting, by the network, second system information for a multimedia broadcast multicast service (MBMS) service on the carrier to the communication device when the network determines that the carrier is not the DL-only carrier; and
    transmitting, by the network, the second system information for the MBMS service on the carrier to the communication device when the network determines that the carrier is the DL-only carrier, wherein the second system information does not have all of the at least one information element for the UL transmission, wherein the second system information comprises at least one of SchedulingInfoList, si-WindowLength, systemInfoValueTag, mbsfn-SubframeConfigList, BCCH-Config, PCCH-Config and PDSCH-ConfigCommon.

2. The method of claim 1, wherein the first system information comprises at least one of System Information Block Type 1 (SIB1) and System Information Block Type 2 (SIB2).

3. The method of claim 1, further comprising:
    transmitting, by the network, System Information Block Type 13 (SIB13) on the DL-only carrier to the communication device.

4. The method of claim 1, wherein the communication device receives the second system information, and receives the MBMS service according to the second system information.

5. A network of handling a downlink (DL)-only carrier, the network comprising:
    a storage device, for storing instructions of:
    determining whether a carrier is the DL-only carrier or not;
    transmitting first system information on the carrier to a communication device when determining that the carrier is not the DL-only carrier;
    not transmitting the first system information on the carrier to the communication device when determining that the carrier is the DL-only carrier, wherein the first system information comprises at least one information element for an uplink (UL) transmission and the at least one information element is mandatory to be present in the first system information according to a third Generation Partnership Project (3GPP) standard and comprises at least one of RACH-ConfigCommon, PRACH-Config-SIB, PUSCH-ConfigCommon, PUCCH-ConfigCommon, SoundingRS-UL-ConfigCommon, UplinkPowelControlCommon, UL-CyclicPrefixLength, UplinkPowelControlCommon-v1020 and TDD-Config;
    not transmitting second system information for a multimedia broadcast multicast service (MBMS) service on the carrier to the communication device when determining that the carrier is not the DL-only carrier; and
    transmitting the second system information for the MBMS service on the carrier to the communication device, wherein the second system information does not have all of the at least one information element for the UL transmission when determining that the carrier is the DL-only carrier, wherein the second system information comprises at least one of SchedulingInfoList, si-WindowLength, systemInfoValueTag, mbsfn-SubframeConfigList, BCCH-Config, PCCH-Config and PDSCH-ConfigCommon; and
    a processing circuit, coupled to the storage device, configured to execute the instructions stored in the storage device.

6. The network of claim 5, wherein the first system information comprises at least one of System Information Block Type 1 (SIB1) and System Information Block Type 2 (SIB2).

7. The network of claim 5, the storage device further stores the instruction of:
    transmitting System Information Block Type 13 (SIB13) on the DL-only carrier to the communication device.

* * * * *